United States Patent [19]
Desarzens et al.

[11] 3,857,274
[45] Dec. 31, 1974

[54] APPARATUS FOR RAPIDLY EVALUATING THE RATE OF A TIMEKEEPER

[75] Inventors: Pierre Desarzens; Jacques Vogt, both of Bienne, Switzerland

[73] Assignee: Omega Louis Brandt & Trere S.A., Berne, Canada

[22] Filed: Aug. 10, 1971

[21] Appl. No.: 170,523

[30] Foreign Application Priority Data
Sept. 15, 1970 Switzerland.................. 13662/70

[52] U.S. Cl..................................... 73/6, 324/78 D
[51] Int. Cl. ............................................. G04d 7/12
[58] Field of Search ................. 73/6; 324/78 D, 186

[56] References Cited
UNITED STATES PATENTS

| | | | |
|---|---|---|---|
| 3,229,203 | 1/1966 | Minohara.......................... | 324/186 X |
| 3,238,764 | 3/1966 | Greiner..................................... | 73/6 |
| 3,370,456 | 2/1968 | Jucker ..................................... | 73/6 |
| 3,395,566 | 8/1968 | Jucker ..................................... | 73/6 |
| 3,756,066 | 9/1973 | Izumi et al.............................. | 73/6 |
| 3,777,547 | 12/1973 | Bolliger.................................. | 73/6 |

Primary Examiner—Richard C. Queisser
Assistant Examiner—Frederick Shoon
Attorney, Agent, or Firm—Imirie, Smiley & Linn

[57] ABSTRACT

A device for rapidly evaluating the rate of a timekeeper such as an oscillator-controlled watch. The watch is placed on a microphone, the frequency of its oscillator is divided by a number equal to its normal operating frequency. A standard oscillator is also connected to a divider where its frequency is also divided by a number equal to its frequency. The outputs of the dividers, which are pulses 1 second long (in the case of the standard) and approximately 1 second (in the case of the watch) are applied to a gate which passes impulses at the standard frequency rate during the difference in time between the two pulses. The passed impulses are counted and displayed, together with a + or − sign, as the inaccuracy of the watch in fractions of a second per day. The sensitivity of the device is adjustable.

8 Claims, 2 Drawing Figures

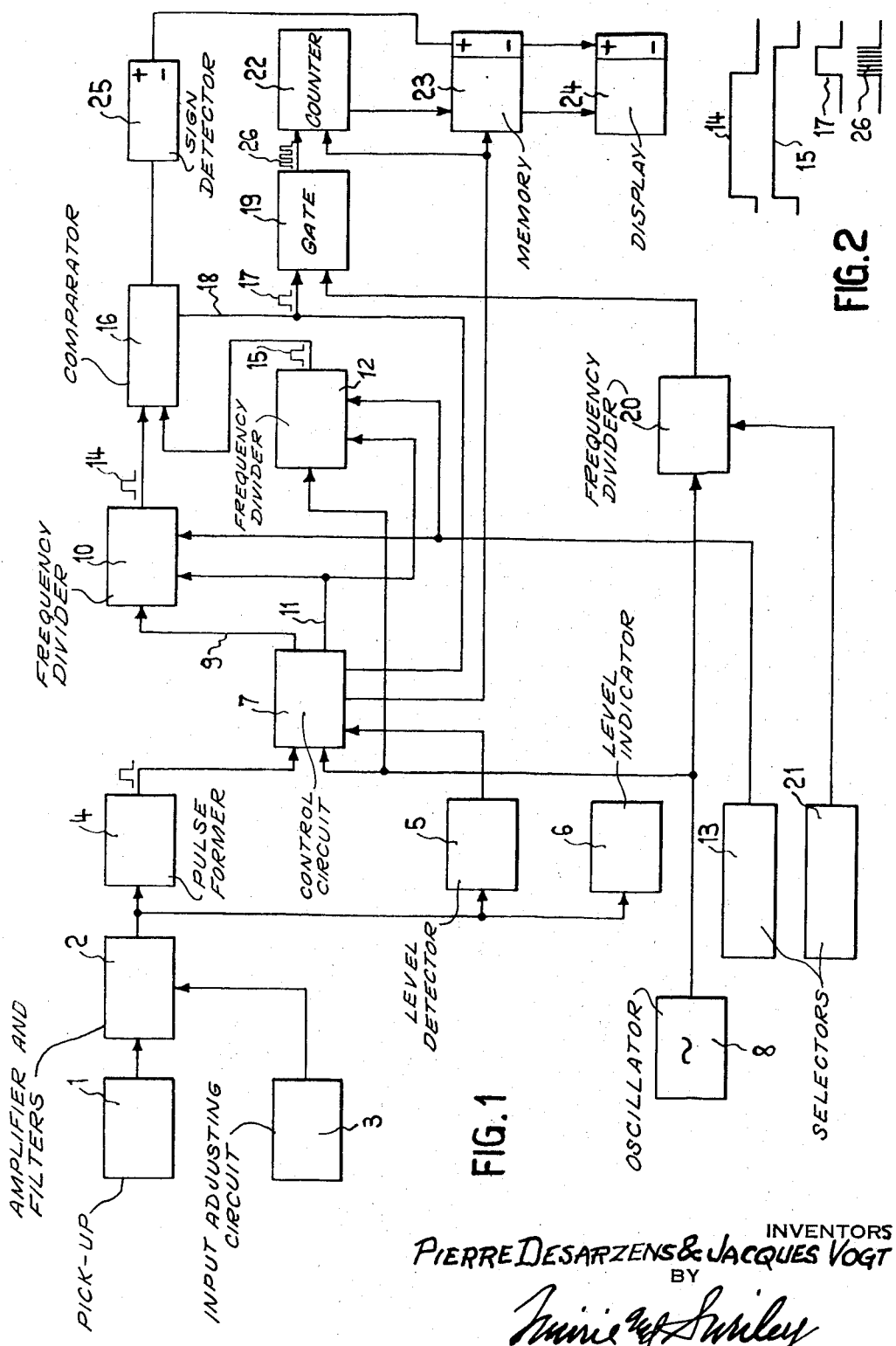

APPARATUS FOR RAPIDLY EVALUATING THE RATE OF A TIMEKEEPER

The present invention relates to a method for rapidly determining the instantaneous rate of a timekeeper operating on the tuning fork or resonator principle, the method being one in which the deviation from a standard rate is indicated in seconds per day by counting the number of periods of a standard oscillator during an interval of time dependant upon the instantaneous rate of the timekeeper.

According to a method known from Swiss Pat. No. 383,889, a number of periods of a standard oscillator are counted during an interval of time determined by a certain integral number of periods of the timekeeper the length of the said interval and of the standard frequency being chosen in such a manner that the said number of periods of the standard frequency if the timekeeper is strictly accurate, is equal to 86,400. Under these conditions, the difference between the theoretical number of 86,400 and the number of periods of the standard oscillator actually counted indicates directly the gain or loss in seconds per day. This known process necessitates the counting of a number of the order of 86,400 periods of the standard oscillator for each measurement, and the calculation of the difference, either positive or negative between the ideal number and the counted number. The electronic solution of this problem is complicated. The known method proposes a choice of the standard period in such a manner that the product of the standard frequency and the counting time is equal 86,400 for any given timepiece. It is however difficult and costly to provide several accurately controlled oscillators which oscillate, for example, at the respective frequencies of 256, 300, 360,480 or 720 Hz.

The object of the present invention is to provide a method and an apparatus for measuring the instantaneous rate of a timekeeper which permits an exact measurement of the rates of timekeepers oscillating at different frequencies, without the need for a complicated counter and several standard oscillators. By this method it is sufficient to count the number of periods of the standard oscillator during a relatively short time. By suitably choosing the time of counting and the frequency of the standard oscillator, the divergence from standard time can be determined to a second, one-tenth of a second, one-hundredth of a second or one-thousandth of a second per day. The counting can still be done by simple addition and by the provision of a sign corresponding to fast or slow running. A relatively high standard frequency, for example $8.64 \times 10^6$ Hz. can be used, which allows a very accurate measurement. The standard frequency can be divided by a factor of 10 to lower the sensitivity of the apparatus if it is necessary to measure the rate of an inaccurate timekeeper.

The invention will now be described with reference to the accompanying drawings which show one embodiment of apparatus according to the present invention.

FIG. 1 is a schematic electrical block diagram of the apparatus, and

FIG. 2 is a diagram representing the principle of measurement.

The apparatus shown comprises a pick-up 1, such as a microphone, producing an electrical signal at the frequency of the timekeeper, for example, of the resonator of an electronic watch. This signal is amplified in an amplifier 2 comprising filters tuned to the usual frequencies of the resonators used in electronic watches, e.g., 180, 360, 480 and 720 Hz. An input adjusting circuit 3 allows adjustment of the amplifier 2 and its filters respectively to the frequency of the timekeeper to be measured. The output signal of the amplifier 2 is applied to a circuit 4 which squares it to the form shown, to a level detector 5 and to a level indicator 6. Level detector 5 and level indicator 5 are in an active condition as long as a watch is applied on pick-up 1 and signals are received from this watch. The output impulses formed by the circuit 4 are transmitted to one of the inputs of a synchronization and control circuit 7. Another input of the circuit 7 is fed by the output impulses of a standard oscillator 8 which oscillates at a frequency of $8.64 \times 10^6$ Hz. The synchronisation circuit 7 has a first output 9 leading to the input of a frequency divider 10. The impulses from the output of the circuit 4 are transmitted to the output 9 and thence to the input of frequency divider 10 from the time when the circuit 7 is engaged. From this moment, an output 11 of the circuit 7 acts on the control inputs of the frequency divider 10 and of a further frequency divider 12 fed at its input by the standard frequency of the oscillator 8. A selection device 13 determines the rate of division of the two dividers 10 and 12 in such a manner that this rate is equal to the input frequency or to 10 times the input frequency. In this particular case, the rate of division of the divider 10 can be adjusted to the usual frequencies of known timekeepers, e.g., 256, 300, 360, 480 or 720 Hz. or to 1,800, 2,560, 3,000 3,600, 4,800 or 7,200 Hz. The rate of division of the divider 12 can be adjusted either to $8.64 \times 10^6$ or to $8.64 \times 10^7$. The impulses of the outputs 14 and 15 of the frequency dividers 10 and 12 are transmitted to two inputs of a comparator 16. This comparator 16 produces an output signal 17 at its output 18 when there is a difference between the input signals 14 and 15. The output impulses are transmitted to one input of a gate 19. The other input of the gate 19 is fed directly with the standard frequency or alternatively with the standard frequency divided by 10 in a frequency divider 20.

Divider 20 is brought into use by means of a selection circuit 21. The output of the gate 19 is taken to the input of a counter 22 the output of which is connected to store 23 and to a dispslay means 24. The output of the level detector circuit 5 acts, through the intermediary of circuit 7, on the control inputs of the counter 22 and of the memory 23 to reset them to zero as explained later on.

The comparator 16 acts on a sign detector circuit 25 the output of which is connected through the memory 23 to the display means 24.

The utilization and function of the apparatus shown are as described below. The selective amplifier 2 is adjusted to the frequency of the timekeeper to be measured. The rate of division of the frequency divider 10 is adjusted to this same frequency or to ten times this frequency. The rate of divider 12 is adjusted in the same manner, i.e., to the standard frequency or to a value 10 times greater than this. The frequency divider 20 is adjusted to the rate of one or 10 according to the desired precision of measurement. The position of the decimal point on the display 24 is thereafter correctly adjusted. The oscillator 8 and all the other circuits are now energized.

When a watch or a timepiece with a mechanical oscillator is placed on the pick-up 1, a signal of the frequency of the oscillator is transmitted by the circuits 2 and 4 to one of the inputs of the synchronization and control circuit 7. At the same time, an output from the standard oscillator 8 is transmitted to another input of the circuit 7, to the input of the divider 12 and to the one input of the gate 19. The counter 22 is set at zero, whilst the memory 23 and the display device 24 may show the result of a previous measurement. The synchronization and control circuit 7 is maintained engaged by level detector 5 which is in active condition as mentioned above by impulses from the signal of the timekeeper and energises the outputs 9 and 11; the frequency dividers 10 and 12 are engaged at the same time. The output impulses 14 and 15 shown in FIG. 2 appear at the outputs of the dividers 10 and 12. If it is assumed that the rate of division of dividers 10 and 12 is equal to the frequencies to be divided, the duration of the impulses 14 and 15 at the output of these frequency dividers are equal to a measured second and a standard second respectively. In other words, as the frequency of a timekeeper of 360 Hz., for example, is divided by 360, the output impulse 14 of the divider 10 has a duration corresponding to 1 second as measured by the rate of the timepiece. On the other hand, since the standard frequency of $8.64 \times 10^6$ Hz. is divided by a rate divider of $8.64 \times 10^6$, the output impulse 15 of the frequency divider 12 has a duration corresponding exactly to a standard second; the accuracy of the oscillator 8 is considered as being perfect.

The duration of the output impulse 17 of the comparator 16 corresponds exactly to the difference between a measured second and a standard second. During this time, gate 19 transmits impulses 26 of the standard frequency to the counter 22. When counting is effected at the frequency of the oscillator 8 of $8.64 \times 10^6$ Hz; the counter 22 indicates the departure from the standard rate in hundredths of a second.

The impulse 17 is also transmitted to an input of the control circuit 7, this circuit being responsive to the rear flank of the impulse 17. By a first output impulse slightly retarded by the control circuit 7, another result of the counter 22 and the circuit 25 is transmitted to the memory 23, in such a manner that a new result is now displayed. Shortly afterwards, a zero resetting impulse is transmitted from circuit 7 to the counter 22. Thereafter, the control circuit 7 is prepared for a new synchronization, started subsequently by an impulse at the frequency of the timekeeper. A new measurement is now effected and the result is introduced into the counter 22 and the circuit 25. At the end of the measurement, the same cycle of the control circuit 7 prepares the apparatus for a new measurement. When the watch or timepiece is removed from the pick-up 1, the level detector 5 transmits a signal to the control circuit 7, by which the memory and the counter are reset to zero.

When it is necessary to measure a more accurate chronometer, it is advantageous to carry out the measurements during a longer period of time. In adjusting the rate of division of the dividers 10 and 12 to 10 times the frequency to be divided, the duration of the output impulses 14 and 15 is 10 seconds and the impulse 17 indicates the difference in rate over a period of 10 seconds. This can be compensated for by adjustment of the decimal point on the display device. If the frequency divider 20 is adjusted to a rate of 10, i.e., when a fixed frequency of $8.64 \times 10^5$ Hz, is used, the sensitivity of the apparatus is lowered by a factor of 10, this new feature being compensated for by displacement of the decimal point on the display device. It is also possible to vary the sensitivity of measurement in a ratio of 1 to 100. For example, the measurement can be effected to a one-tenth, one-hundredth or one-thousandth of a second per day.

The units of time in which the difference in rates is measured, and the fixed frequency, may be otherwise chosen. The rate of division of dividers 10 and 12 can be chosen to obtain output impulses 14 and 15 of whatever duration is required; of several seconds or of a fraction of a second, the fixed frequency being changed to the same range in a manner such that the time interval represented by the impulse 17, i.e., the difference in time between the impulses 14 and 15, multiplied by the standard frequency, is a number which indicates the instantaneous rate error directly.

We claim:

1. Measuring apparatus for measurment of the instantaneous rate of a time-keeper, comprising a pick-up for detecting the beats of said timekeeper, a standard oscillator, and means for counting a number of periods of said standard oscillator during an interval of time depending upon the instantaneous rate of said timekeeper, wherein said means comprises a first divider for the frequency of said timekeeper, said first divider being adjustable to any of a plurality of timekeeper oscillation rates, a filter regulatable to the frequencies of different timekeepers preceding said first divider, and a second divider for said standard frequency, the two frequencies being divided to produce each an output pulse of the same nominal duration, a comparator to determine an interval fo time equal to the difference between the duration of the output impulses of said two dividers, a gate controlled by said comparator to transmit said standard frequency during said interval and a counter-display means to receive, count and display the number of periods of said standard frequency transmitted by said gate.

2. Apparatus as recited in claim 1, wherein said nominal duration is 1 second and the frequency of said standard oscillator is $8.64 \times 10^6$ Hz.

3. Apparatus as recited in claim 1, wherein the rate of division of said dividers is equal to the frequency to be divided.

4. Apparatus as recited in claim 1 wherein said nominal duration is 10 seconds and the frequency of said standard oscillator is $8.64 \times 10^5$ Hz.

5. Apparatus as recited in claim 1, including an indicator of the sign of the difference of duration of said output impulses.

6. Apparatus as recited in claim 1, including a signal level detector responsive to the signal from said timekeeper, and means for resetting the counter-indicator to zero, said means being controlled by said level detector.

7. Apparatus as recited in claim 1, wherein said divider for the frequency of the timekeeper is adjustable to a number of rates equal to usual frequencies of timekeeprs and to rates equal to 10 times said usual frequencies of timekeepers, while said divider for the standard frequency is adjustable to a first rate equal to said standard frequency and to a seocnd rate equal to 10 times said standard frequency, such that the duration of said output pulses is adjustable selectively to 1 to 10 seconds.

8. Apparatus as recited in claim 7, wherein a frequency divider is connected between said standard oscillator and means for counting output pulses from said second frequency divider, the rate of said second frequency divider being selectively adjustable to 1 and 10.

* * * * *

UNITED STATES PATENT OFFICE
CERTIFICATE OF CORRECTION

PATENT NO. : 3,857,274
DATED : December 31, 1974
INVENTOR(S) : Pierre Desarzens, et al It is certified that error appears in the above-identified patent and that said Letters Patent are hereby corrected as shown below:

- Assignees' name and address:
    OMEGA LOUIS BRANDT & FRERE S.A., Bienne, Switzerland

- Claim 1, line 14:
    an interval of time and not "fo" time

- Claim 7, line 7:
    to a second rate instead of "seocnd"

- Claim 7, penultimate line:
    selectively to 1 or 10 instead of "1 to 10"

Signed and sealed this 13th day of May 1975.

(SEAL)
Attest:

RUTH C. MASON
Attesting Officer

C. MARSHALL DANN
Commissioner of Patents
and Trademarks